(12) United States Patent
Brickell

(10) Patent No.: US 7,454,611 B2
(45) Date of Patent: *Nov. 18, 2008

(54) SYSTEM AND METHOD FOR ESTABLISHING TRUST WITHOUT REVEALING IDENTITY

(75) Inventor: Ernie F. Brickell, Portland, OR (US)

(73) Assignee: Intel Corporation, Santa Clara, CA (US)

(*) Notice: Subject to any disclaimer, the term of this patent is extended or adjusted under 35 U.S.C. 154(b) by 87 days.

This patent is subject to a terminal disclaimer.

(21) Appl. No.: 11/622,391

(22) Filed: Jan. 11, 2007

(65) Prior Publication Data

US 2007/0113077 A1    May 17, 2007

Related U.S. Application Data

(63) Continuation of application No. 10/306,336, filed on Nov. 27, 2002, now Pat. No. 7,165,181.

(51) Int. Cl.
G06F 9/00 (2006.01)
(52) U.S. Cl. .................. 713/161; 713/164; 713/176; 713/182
(58) Field of Classification Search .......... 713/161, 713/164, 176, 182
See application file for complete search history.

(56) References Cited

U.S. PATENT DOCUMENTS

| | | |
|---|---|---|
| 3,699,532 A | 10/1972 | Schaffer et al. |
| 3,996,449 A | 12/1976 | Attanasio et al. |
| 4,037,214 A | 7/1977 | Birney et al. |
| 4,162,536 A | 7/1979 | Morley |
| 4,207,609 A | 6/1980 | Luiz et al. |
| 4,247,905 A | 1/1981 | Yoshida et al. ............... 711/166 |

(Continued)

FOREIGN PATENT DOCUMENTS

DE    4217444    12/1992

(Continued)

OTHER PUBLICATIONS

Ateniese, Giuseppe, et al., "A Practical and Provably Secure Coalition-Resistant Group Signature Scheme", *Advances in Cryptology—CRYPTO2000, vol. 1880 of Lecture Notes in Computer Science*, Int'; Assoc for Crypt Res, Spring-Verlag, Berlin, Germany,(2000),255-270.

(Continued)

*Primary Examiner*—Thomas R Peeso
(74) *Attorney, Agent, or Firm*—Blakely, Sokoloff, Taylor & Zafman LLP

(57) ABSTRACT

One aspect of an embodiment of the invention provides a method, system, and device to prove to a challenger that a prover device has a signature from a device manufacturer without revealing the signature to the challenger. According to one implementation, a challenger is provided with the result of a one-way function of a secret held by a prover device. An interactive proof is employed, between the prover device and the challenger, to prove to the challenger that the secret used in the one-way function has been signed by a device signature without revealing the secret or the device signature or the prover device's identity to the challenger.

11 Claims, 7 Drawing Sheets

U.S. PATENT DOCUMENTS

| | | |
|---|---|---|
| 4,276,594 A | 6/1981 | Morley |
| 4,278,837 A | 7/1981 | Best |
| 4,307,447 A | 12/1981 | Provanzano et al. |
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |
| 4,403,283 A | 9/1983 | Myntti et al. |
| 4,419,724 A | 12/1983 | Branigin et al. |
| 4,430,709 A | 2/1984 | Schleupen et al. |
| 4,521,852 A | 6/1985 | Guttag |
| 4,529,870 A | 7/1985 | Chaum |
| 4,571,672 A | 2/1986 | Hatada et al. |
| 4,621,318 A | 11/1986 | Maeda ............... 364/200 |
| 4,759,064 A | 7/1988 | Chaum |
| 4,795,893 A | 1/1989 | Ugon |
| 4,802,084 A | 1/1989 | Ikegaya et al. |
| 4,825,052 A | 4/1989 | Chemin et al. |
| 4,907,270 A | 3/1990 | Hazard |
| 4,907,272 A | 3/1990 | Hazard |
| 4,910,774 A | 3/1990 | Barakat |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth ............... 711/164 |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,293,424 A | 3/1994 | Holtey et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A | 4/1996 | Nakajima et al. |
| 5,522,075 A | 5/1996 | Robinson et al. |
| 5,528,231 A | 6/1996 | Patarin |
| 5,533,126 A | 7/1996 | Hazard et al. |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubala |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,628,023 A | 5/1997 | Bryant et al. ............... 398/800 |
| 5,633,929 A | 5/1997 | Kaliski, Jr. |
| 5,657,445 A | 8/1997 | Pearce |
| 5,668,971 A | 9/1997 | Neufeld |
| 5,680,547 A | 10/1997 | Chang |
| 5,684,948 A | 11/1997 | Johnson et al. |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer, Jr. et al. ....... 711/163 |
| 5,740,178 A | 4/1998 | Jacks et al. |
| 5,752,046 A | 5/1998 | Oprescu et al. |
| 5,757,919 A | 5/1998 | Herbert et al. |
| 5,764,969 A | 6/1998 | Kahle |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,815,665 A | 9/1998 | Teper et al. |
| 5,825,875 A | 10/1998 | Ugon |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal |
| 5,901,225 A | 5/1999 | Ireton et al. |
| 5,903,752 A | 5/1999 | Dingwall et al. |
| 5,919,257 A | 7/1999 | Trostle |
| 5,935,242 A | 8/1999 | Madany et al. |
| 5,935,247 A | 8/1999 | Pai et al. |
| 5,937,063 A | 8/1999 | Davis |
| 5,944,821 A | 8/1999 | Angelo ............... 364/200 |
| 5,953,502 A | 9/1999 | Helbig, Sr. |
| 5,956,408 A | 9/1999 | Arnold |
| 5,970,147 A | 10/1999 | Davis et al. |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,035,374 A | 3/2000 | Panwar et al. |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo et al. |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Isley |
| 6,138,239 A | 10/2000 | Veil |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone et al. |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |
| 6,249,872 B1 | 6/2001 | Wildgrube et al. .......... 713/200 |
| 6,252,650 B1 | 6/2001 | Nakamura |
| 6,269,392 B1 | 7/2001 | Cotichini et al. |
| 6,272,533 B1 | 8/2001 | Browne ............... 709/213 |

| | | | | | | |
|---|---|---|---|---|---|---|
| 6,272,637 | B1 | 8/2001 | Little et al. ............. 713/194 | EP | 0965902 | 12/1999 |
| 6,275,933 | B1 | 8/2001 | Fine et al. | EP | 1030237 | 8/2000 |
| 6,282,650 | B1 | 8/2001 | Davis | EP | 1055989 | 11/2000 |
| 6,282,651 | B1 | 8/2001 | Ashe | EP | 1056014 | 11/2000 |
| 6,282,657 | B1 | 8/2001 | Kaplan et al. | EP | 1085396 | 3/2001 |
| 6,292,874 | B1 | 9/2001 | Barnett ............. 711/153 | EP | 1146715 | 10/2001 |
| 6,301,646 | B1 | 10/2001 | Hostetter | EP | 1209563 | 5/2002 |
| 6,308,270 | B1 | 10/2001 | Guthery et al. | EP | 1271277 | 1/2003 |
| 6,314,409 | B2 | 11/2001 | Schneck et al. | JP | 2000076139 | 3/2000 |
| 6,321,314 | B1 | 11/2001 | Van Dyke | WO | WO9524696 | 9/1995 |
| 6,327,652 | B1 | 12/2001 | England et al. | WO | WO9729567 | 8/1997 |
| 6,330,670 | B1 | 12/2001 | England et al. | WO | WO9812620 | 3/1998 |
| 6,339,815 | B1 | 1/2002 | Feng | WO | WO9834365 | 8/1998 |
| 6,339,816 | B1 | 1/2002 | Bausch | WO | WO9844402 | 10/1998 |
| 6,357,004 | B1 | 3/2002 | Davis | WO | WO9905600 | 2/1999 |
| 6,363,485 | B1 | 3/2002 | Adams | WO | WO9918511 | 4/1999 |
| 6,374,286 | B1 | 4/2002 | Gee et al. | WO | WO9957863 | 11/1999 |
| 6,374,317 | B1 | 4/2002 | Ajanovic et al. ............. 710/105 | WO | WO9965579 | 12/1999 |
| 6,378,068 | B1 | 4/2002 | Foster | WO | 0021238 | 4/2000 |
| 6,378,072 | B1 | 4/2002 | Collins et al. | WO | WO0021238 | 4/2000 |
| 6,389,537 | B1 | 5/2002 | Davis et al. | WO | WO0062232 | 10/2000 |
| 6,397,242 | B1 | 5/2002 | Devine et al. | WO | WO0127723 | 4/2001 |
| 6,397,379 | B1 | 5/2002 | Yates, Jr. et al. | WO | WO0127821 | 4/2001 |
| 6,412,035 | B1 | 6/2002 | Webber | WO | WO0163994 | 8/2001 |
| 6,421,702 | B1 | 7/2002 | Gulick | WO | WO0175564 | 10/2001 |
| 6,435,416 | B1 | 8/2002 | Slassi | WO | WO0175565 | 10/2001 |
| 6,445,797 | B1 | 9/2002 | McGough et al. | WO | WO0175595 | 10/2001 |
| 6,463,535 | B1 | 10/2002 | Drews et al. | WO | WO0201794 | 1/2002 |
| 6,463,537 | B1 | 10/2002 | Tello | WO | WO9909482 | 1/2002 |
| 6,473,800 | B1 | 10/2002 | Jerger et al. | WO | WO0217555 | 2/2002 |
| 6,499,123 | B1 | 12/2002 | McFarland et al. | WO | WO02060121 | 8/2002 |
| 6,505,279 | B1 | 1/2003 | Phillips et al. | WO | WO02086684 | 10/2002 |
| 6,507,904 | B1 | 1/2003 | Ellison et al. | WO | WO03058412 | 7/2003 |
| 6,529,909 | B1 | 3/2003 | Bowman-Amuah | | | |
| 6,535,988 | B1 | 3/2003 | Poisner | | | |
| 6,557,104 | B2 | 4/2003 | Vu et al. | | | |
| 6,560,627 | B1 | 5/2003 | McDonald et al. | | | |
| 6,609,199 | B1 | 8/2003 | DeTreville | | | |
| 6,615,278 | B1 | 9/2003 | Curtis | | | |
| 6,633,963 | B1 | 10/2003 | Ellison et al. | | | |
| 6,633,981 | B1 | 10/2003 | Davis | | | |
| 6,651,171 | B1 | 11/2003 | England et al. | | | |
| 6,678,825 | B1 | 1/2004 | Ellison et al. | | | |
| 6,684,326 | B1 | 1/2004 | Cromer et al. | | | |
| 6,988,250 | B1 | 1/2006 | Proudler et al. | | | |
| 7,028,149 | B2 | 4/2006 | Grawrock et al. | | | |
| 2001/0021969 | A1 | 9/2001 | Burger et al. | | | |
| 2001/0027511 | A1 | 10/2001 | Wakabayashi et al. | | | |
| 2001/0027527 | A1 | 10/2001 | Khidekel et al. | | | |
| 2001/0037450 | A1 | 11/2001 | Metlitski et al. | | | |
| 2002/0007456 | A1 | 1/2002 | Peinado et al. | | | |
| 2002/0023032 | A1 | 2/2002 | Pearson et al. | | | |
| 2002/0147916 | A1 | 10/2002 | Strongin et al. | | | |
| 2002/0166061 | A1 | 11/2002 | Falik et al. | | | |
| 2002/0169717 | A1 | 11/2002 | Challener | | | |
| 2003/0018892 | A1 | 1/2003 | Tello | | | |
| 2003/0074548 | A1 | 4/2003 | Cromer et al. | | | |
| 2003/0115453 | A1 | 6/2003 | Grawrock | | | |
| 2003/0126442 | A1 | 7/2003 | Glew et al. | | | |
| 2003/0126453 | A1 | 7/2003 | Glew et al. | | | |
| 2003/0159056 | A1 | 8/2003 | Cromer et al. | | | |
| 2003/0188179 | A1 | 10/2003 | Challener et al. | | | |
| 2003/0196085 | A1 | 10/2003 | Lampson et al. | | | |
| 2004/0117539 | A1 | 6/2004 | Bennett et al. | | | |

FOREIGN PATENT DOCUMENTS

| | | |
|---|---|---|
| EP | 0473913 | 3/1992 |
| EP | 0600112 | 6/1994 |
| EP | 0602867 | 6/1994 |
| EP | 0892521 | 1/1999 |
| EP | 0930567 | 7/1999 |
| EP | 0961193 | 12/1999 |

OTHER PUBLICATIONS

Berg, Cliff., "How Do I Create a Signed Applet?", *Dr. Dobb'Journal*, (Aug. 1997),1-9.

Brands, Stefan , "Restrictive Blinding of Secret-Key Certificates", *Springer-Verlag* XP002201306, (1995),Chapter 3.

Chien, Andrew A., et al., "Safe and Protected Execution for the Morph/AMRM Reconfigurable Processor", *7th Annual IEEE Symposium, FCCM '99 Proceedings*, XP010359180, ISBN 0-7695-0375-6, Los Alamitos, CA, (Apr. 21, 1999),209-221.

Compaq Computer Corporation, "Trusted Computing Platform Alliance (TCPA) Main Specification Version 1.1a", XP002272822, (Jan. 25, 2001),1-321.

Coulouris, George , et al., "Distributed Systems, Concepts and Designs", *2nd Edition*, (1994),422-424.

Crawford, John , "Architecture of the Intel 80386", *Proceedings of the IEEE International Conference on Computer Design: VLSI in Computers and Processors (ICCD '86)*, (Oct. 6, 1986),155-160.

Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).

Fabry, R.S. , "Capability-Based Addressing", Fabry, R.S., "Capability-Based Addressing ," *Communications of the ACM*, vol. 17, No. 7, (Jul. 1974),403-412.

Frieder, Gideon , "The Architecture And Operational Characteristics of the VMX Host Machine", *The Architecture And Operational Characteristics of the VMX Host Machine, IEEE*, (1982),9-16.

Goldberg, Robert P. , "Survery of Virtual Machine Research", *Computer Magazine*, (Jun. 1974),34-35.

Gong, Li , et al., "Going Behond the Sandbox: An Overview of the New Security Architecture in the Java Development Kit 1.2", *Proceedings of the USENIX Symposium on Internet Technologies and Systems*, Monterey, CA,(Dec. 1997).

Gum, P. H., "System/370 Extended Architecture: Facilities for Virtual Machines", *IBM J. Research Development*, vol. 27, No. 6, (Nov. 1983),530-544.

Heinrich, Joe, "MIPS R4000 Microprocessor User's Manual, Second Edition", *Chapter 4 "Memory Management"*, (Jun. 11, 1993),61-97.

HP Mobile Security Overview, "HP Mobile Security Overview", (Sep. 2002),1-10.

IBM, "Information Display Technique for a Terminate Stay Resident Program IBM Technical Disclosure Bulletin", *TDB-ACC-No. NA9112156*, vol. 34, Issue 7A, (Dec. 1, 1991),156-158.

IBM Corporation, "IBM ThinkPad T30 Notebooks", *IBM Product Specification*, located at www-1.ibm.com/services/files/cisco_t30_spec_sheet_070202.pdf, last visited Jun. 23, 2004,(Jul. 2, 2002),1-6.

Intel, "IA-32 Intel Architecture Software Developer's Mnaual", *Vol. 3: System Programming Guide,* Intel Corporation-2003, 13-1 through 13-24.

Intel, "Intel386 DX Microprocessor 32-Bit CHMOS Microprocessor With Integrated Memory Management", (1995),5-56.

Intel Corporation, "IA-64 System Abstraction Layer Specification", *Intel Product Specification*, Order No. 245359-011, (Jan. 2000),1-112.

Intel Corporation, "Intel 82802AB/82802AC Firmware Hub (FWH)", *Intel Product Datasheet,* Document No. 290658-004,(Nov. 2000),1-6, 17-28.

Intel Corporation, "Intel IA-64 Architecture Software Developer's Manual", *Vol. 2: IA-64 System Architecture*, Order No. 245318-001, (Jan. 2000),i, ii, 5.1-5.3, 11.1-11.8, 11.23-11.26.

Karger, Paul A., et al., "A VMM Security Kernal for the VAX Architecture", *Proceedings of the Symposium on Research in Security and Privacy*, XP010020182, ISBN 0-8186-2060-9, Boxborough, MA, (May 7, 1990),2-19.

Kashiwagi, Kazuhiko , et al., "Design and Implementation of Dynamically Reconstructing System Software", *Software Engineering Conference,* Proceedings 1996 Asia-Pacific Seoul, South Korea Dec. 4-7, 1996, Los Alamitos, CA USA, IEEE Comput. Soc, US, ISBN 0-8186-7638-8,(1996).

Lawton, Kevin , et al., "Running Multiple Operating Systems Concurrently on an IA32 PC Using Virtualization Techniques", http://www.plex86.org/research/paper.txt, (Nov. 29, 1999),1-31.

Luke, Jahn , et al., "Replacement Strategy for Aging Avionics Computers", *IEEE AES Systems Magazine,* XP002190614,(Mar. 1999).

Menezes, Alfred J., et al., "Handbook of Applied Cryptography", *CRC Press Series on Discrete Mathematices and its Applications,* Boca Raton, FL, XP002165287, ISBN 0849385237,(Oct. 1996),403-405, 506-515, 570.

Menezes, Alfred J., et al, "Handbook of Applied Cryptography", *CRC Press LLC, USA* XP002201307,(1997),475.

Motorola, "M68040 User's Manual", (1993),1-1 to 8-32.

Nanba, S. , et al., "V.M/4: ACOS-4 Virtual Machine Architecture", *VM/4: ACOS-4 Virtual Machine Architecture, IEEE,* (1985),171-178.

Richt, Stefan , et al., "In-Circuit-Emulator Wird Echtzeittauglich", *Elecktronic, Franzis Verlag GMBH*, Munchen, DE, vol. 40, No. 16, XP000259620,(100-103),Aug. 6, 1991.

Robin, John S., et al., "Analysis of the Pentium's Ability to Support a Secure Virtual Machine Monitor", *Proceedings of the 9th USENIX Security Symposium*, XP002247347, Denver, Colorado, (Aug. 14, 2000),1-17.

Rosenblum, M. , "Virtual Platform: A Virtual Machine Monitor for Commodity PC", *Proceedings of the 11th Hotchips, Conference,* (Aug. 17, 1999),185-196.

Saez, Sergio , et al., "A Hardware Scheduler for Complex Real-Time Systems", *Proceedings of the IEEE International Symposium on Industrial Electronics;* XP002190615,(Jul. 1999),43-48.

Schneier, Bruce , "Applied Cryptography: Protocols, Algorithm, and Source Code in C", *Wiley, John & Sons, Inc.,* XP002939871; ISBN 0471117099,(Oct. 1995),47-52.

Schneier, Bruce , "Applied Cryptography: Protocols, Algorithm, and Source Code in C", *Wiley, John & Sons, Inc.,* XP002138607; ISBN 0471117099,(Oct. 1995),56-65.

Schneier, Bruce , "Applied Cryptography: Protocols, Algorithms, and Source Code in C", *Wiley, John & Sons, Inc.,* XP0021111449; ISBN 0471117099,(Oct. 1995),169-187.

Schneier, Bruce , "Applied Cryptography: Protocols, Algorithms, and Source Code in C", *2nd Edition; Wiley, John & Sons, Inc.,* XP002251738; ISBN 0471128457,(Nov. 1995),28-33; 176-177; 216-217; 461-473; 518-522.

Sherwood, Timothy , et al., "Patchable Instruction ROM Architecture", *Department of Computer Science and Engineering*, University of California, San Diego, La Jolla, CA, (Nov. 2001).

SYSTEM AND METHOD FOR ESTABLISHING TRUST WITHOUT REVEALING IDENTITY

RELATED APPLICATIONS

This application is a continuation of application Ser. No. 10/306,336, filed Nov. 27, 2002, now U.S. Pat. No. 7,165,181.

FIELD

Various embodiments of the invention pertain generally to secure communications. More particularly, at least one embodiment of the invention relates to enabling a first device to prove to a second device that it has a valid signature without revealing said signature.

BACKGROUND

In many modern communication systems, including computer networks, the reliability and security of the information being exchanged is a significant concern.

For example, in the Trusted Computing Platform Alliance (TCPA) model, each computer (PC) has a trusted hardware device called a Trusted Platform Module (TPM). In one implementation, the TPM may record information about the software and hardware environment of the PC. Each TPM has a unique endorsement key (EK). There is a certificate issued to the EK which contains information about the TPM and platform. When an outside party, hereinafter called a challenger, wants to know the software and/or hardware environment of the PC, the challenger can ask the TPM to give a report. The challenger wants to be sure that the report is really coming from a valid TPM. The owner of the PC wants to maintain as much privacy as possible. In particular, the owner of the PC wants to be able to give reports to two different challengers without those challengers being able to determine that the reports are coming from the same TPM.

One solution proposed by the TCPA was to establish Trusted Third Parties (TTP). The TPM would create an Attestation Identify Key (AIK) and would send the public portion of the key in a certificate request signed by the EK to a TTP. The TTP would check that the EK was valid, that the signature was okay, and would issue a certificate for the AIK. The TPM would then use the AIK and the certificate of the TTP when the TPM received a request from a challenger. These would be unrelated to the EK, and thus the challenger would get no information about the AIK. The problem with this approach is that it requires TTPs to be established. In practice, identifying parties that can serve as TTPs and a feasible business model for this approach has proven to be a substantial obstacle.

Thus, the need for TTPs in the TCPA architecture has been a problem. However, no one has suggested a cryptographic protocol that achieved the anonymity and security requirements without the use of a TTP.

DETAILED DESCRIPTION

Figure 1:
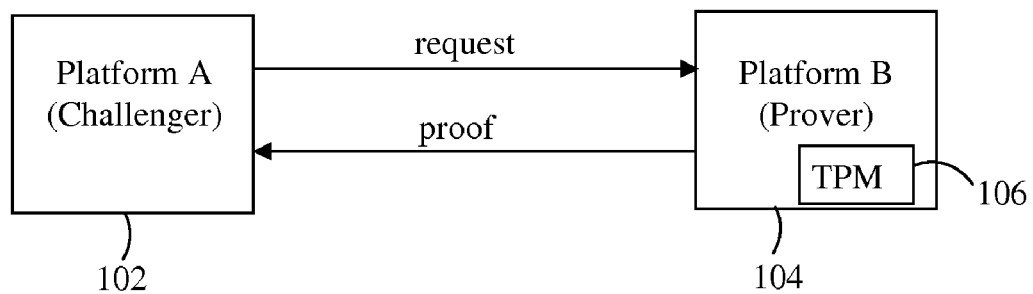
FIG. 1 illustrates a system where a direct proof scheme may be implemented according to an embodiment of the invention.

In the following detailed description of various embodiments of the invention, numerous specific details are set forth in order to provide a thorough understanding of various aspects of one or more embodiments of the invention. However, one or more embodiments of the invention may be practiced without these specific details. In other instances, well known methods, procedures, and/or components have not been described in detail so as not to unnecessarily obscure aspects of embodiments of the invention.

In the following description, certain terminology is used to describe certain features of one or more embodiments of the invention. For instance, "platform" includes any type of device, computer, processing unit, etc. The term "challenger" refers to any person, platform, system, software, and/or device that requests some verification of authenticity or authority from a requester prior to disclosing or providing the requested information to the requester. The term "prover" (e.g., prover device) refers to any person, platform, system, software, and/or device that has been requested to provide some proof of its authority, validity, and/or identity. The term "device manufacturer" (e.g., Device Manufacturer C) refers to any person, platform, system, entity, software, and/or device that manufactures or configures a device or platform (e.g., a Trusted Platform Module). The term "device manufacturer" may be used interchangeably with the term "certifying manufacturer". The term "HASH" refers to any hashing function or algorithm or its equivalent.

Throughout the description and illustration of the various embodiments of the invention discussed hereinafter, coefficients, variables, and other symbols are referred to by the same label or name. Therefore, where a symbol (e.g., h) appears in different parts of the explanation, the same symbol is being referred to throughout.

One aspect of an embodiment of the invention presents a way to provide an authentication system with anonymity for devices without the use of a Trusted Third Party (TTP).

One aspect of an embodiment of the invention provides a method, system, and device to prove to a challenger that a prover platform or device has a signature from a device manufacturer without revealing the signature to the challenger.

Another aspect of an embodiment of the invention provides a method, system, and device to provide to a challenger the result of a one-way function of a secret held by a prover device (e.g., the requesting device), and to prove to the challenger that the secret used in the one-way function has been signed by a device signature without revealing the secret or the signature to the challenger.

As used herein, to "prove" or "convince" a challenger that a prover has or knows a signature or secret means that, based on the information and proof disclosed to the challenger, it is highly probabilistically likely that the prover has the signature or secret. To prove this to a challenger without "revealing" or "disclosing" the signature or secret to the challenger means that, based on the information disclosed to the challenger, it would be computationally infeasible to determine the signature or secret.

Such proofs are hereinafter referred to as direct proofs. The term "direct proof" refers to interactive proofs and/or zero-knowledge proofs, as these types of proofs are commonly known in the field.

FIG. 1 illustrates a system where a direct proof scheme according to an embodiment of the invention may be implemented. A Platform A 102 (Challenger) requests that Platform B 104 (Prover) provide some information about itself and Platform B 104 provides said requested information. However, Platform A 102 wants to make sure that the requested information came from a device manufactured by Device Manufacturer C. Thus, Platform A 102 challenges Platform B 104 to show that it has a signature generated by Device Manufacturer C. Platform B 104 replies to such request by providing information which convinces Platform A 102 that Platform B 104 has a signature generated by a Device Manufacturer C, without revealing the signature.

In one embodiment of the invention, Platform B 104 may include a Trusted Platform Module (TPM) 106. It is manufactured by a device manufacturer so that it performs the functions necessary for this invention and conforms to the operations of the protocols described herein. In general, the TPM should be manufactured to maintain the security features described herein. For example, in the protocol IP1 described below and illustrated in FIG. 6, the TPM performs specified functions using specified values. A TPM should be manufactured or configured to use values (e.g., the values specified below) that would not create a security flaw in the protocol (e.g., make it likely that a device's identify can be determined, etc.).

Figure 2:
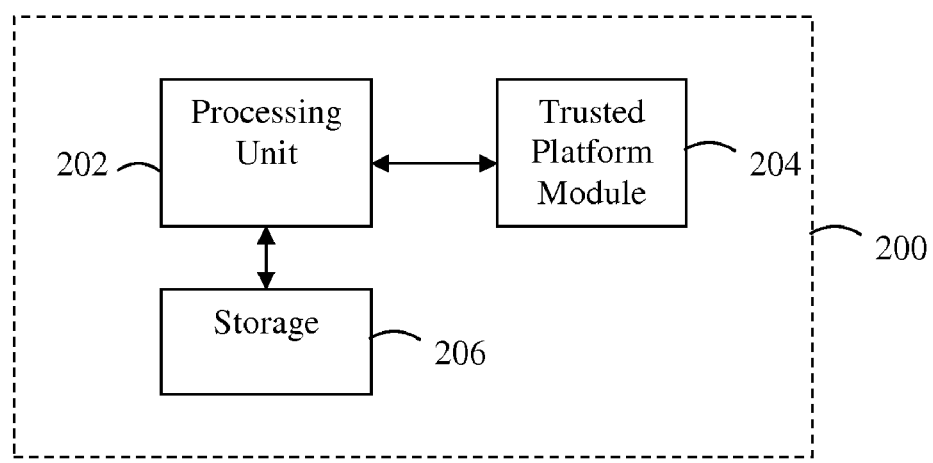
FIG. 2 is a block diagram illustrating one embodiment of a platform including a Trusted Platform Module according to one embodiment of the invention.

FIG. 2 is a block diagram illustrating one embodiment of a device or platform 200 (e.g., Platform B 104) with a Trusted Platform Module (TPM) 204 according to one embodiment of the invention. The device 200 may include a processing unit 202 coupled to the TPM 204. In one implementation, a storage device 206 may also be included in the device 200 to permit storage of information about the device 200 (e.g., hardware information, software information, etc.). In various implementations of the invention, the platform or device 200 may be an electronic device such as a computer, mobile device, etc.

Figure 3:
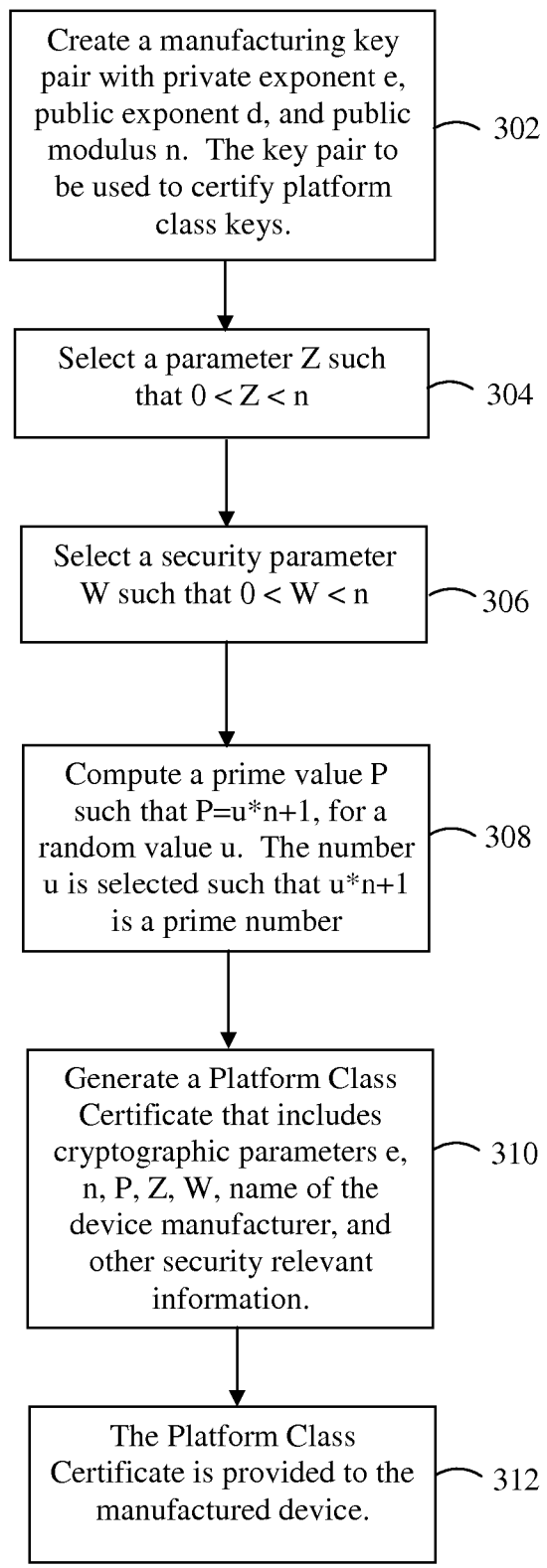
FIG. 3 illustrates a procedure to setup a TPM during manufacturing according to one embodiment of the invention.

FIG. 3 illustrates the setup performed for each platform class according to one embodiment of the invention. A platform class may be defined by the device manufacturer to include one or more types of platforms or devices. For instance, a platform class may be the set of all platforms that have the same security relevant information. Each platform has a set of security relevant information about the platform. This information could contain some of the information that is included in the EK or AIK certificate in the TCPA model. It could also include the manufacturer and model number of the particular platform or device.

For each platform class, a device manufacturer creates the cryptographic parameters that the manufacturer uses for that platform class. The device manufacturer creates a signature key that it uses to sign the secrets for the devices (e.g., device 200) that it manufactures.

In one embodiment of the invention, the device manufacturer employs the RSA algorithm (a public-key cryptosystem defined by Ronald Rivest, Adi Shamir, and Leonard Adelman) to create an RSA public, private key pair with public modulus n, public exponent d, and private exponent e 302. This can be created using well known methods, such as those described in *Applied Cryptography*, by Bruce Schneier, John Wiley & Sons; ISBN: 0471117099; Second Edition (Oct. 18, 1995). The modulus n should be chosen large enough so that it was computationally infeasible to factor n.

The device manufacturer specifies a parameter Z, which is an integer between zero (0) and n 304.

The device manufacturer specifies a security parameter W, which is an integer between zero (0) and n 306. However, picking W too small or too large may introduce a security failure. In one implementation it may be recommended that W be chosen between $2^{160}$ and $n/2^{160}$. Accordingly, choosing W to be approximately $\sqrt{n}$ may be a reasonable choice.

In one embodiment of the invention, the device manufacturer computes a prime number P, such that $P=u*n+1$ 308. There is nothing special about the value of u, other than that $u*n+1$ is a prime number. For example, the smallest such value u can be used. Generally, the value P should to be large enough so that computing discrete logarithms mod P is computationally infeasible.

The device manufacturer generates a Platform Class Certificate that includes the cryptographic parameters e, n, u, P, Z, W, the security relevant information of the platform class, and the name of the device manufacturer 310. In one embodiment, the parameters u and P would not both be included since given n and one of these parameters, the other can be computed by $P=u*n+1$.

In one embodiment of the invention, the device manufacturer uses the same e, n, u, P, W for several different platform classes, and just varies the value Z for the different platforms. In this case, the values of Z should be chosen to differ by at least 4W.

Once the Platform Class Certificate is generated, the device manufacturer provides the Class Certificate to the devices it manufactures which belong to that particular platform class 312.

The distribution of the Platform Class Certificate from a prover device or platform (e.g., Platform A in FIG. 1) to a challenger may be accomplished in a number of ways without deviating from one or more embodiments of the invention. These cryptographic parameters, i.e., Platform Class Certificate, should be distributed to the challenger in such a way that the challenger is convinced that the Class Certificate was generated by the device manufacturer. There are accepted standard methods for doing this, either through distributing the parameters directly to the challenger, or by having the Platform Class Certificate signed by a certifying authority. In this latter case, the public key of the certifying authority must be distributed to the challenger, and the signed Platform Class Certificate can be given to each device or platform (e.g., prover device) in the Platform Class. The device can then give the signed Platform Class Certificate to the challenger.

Figure 4:
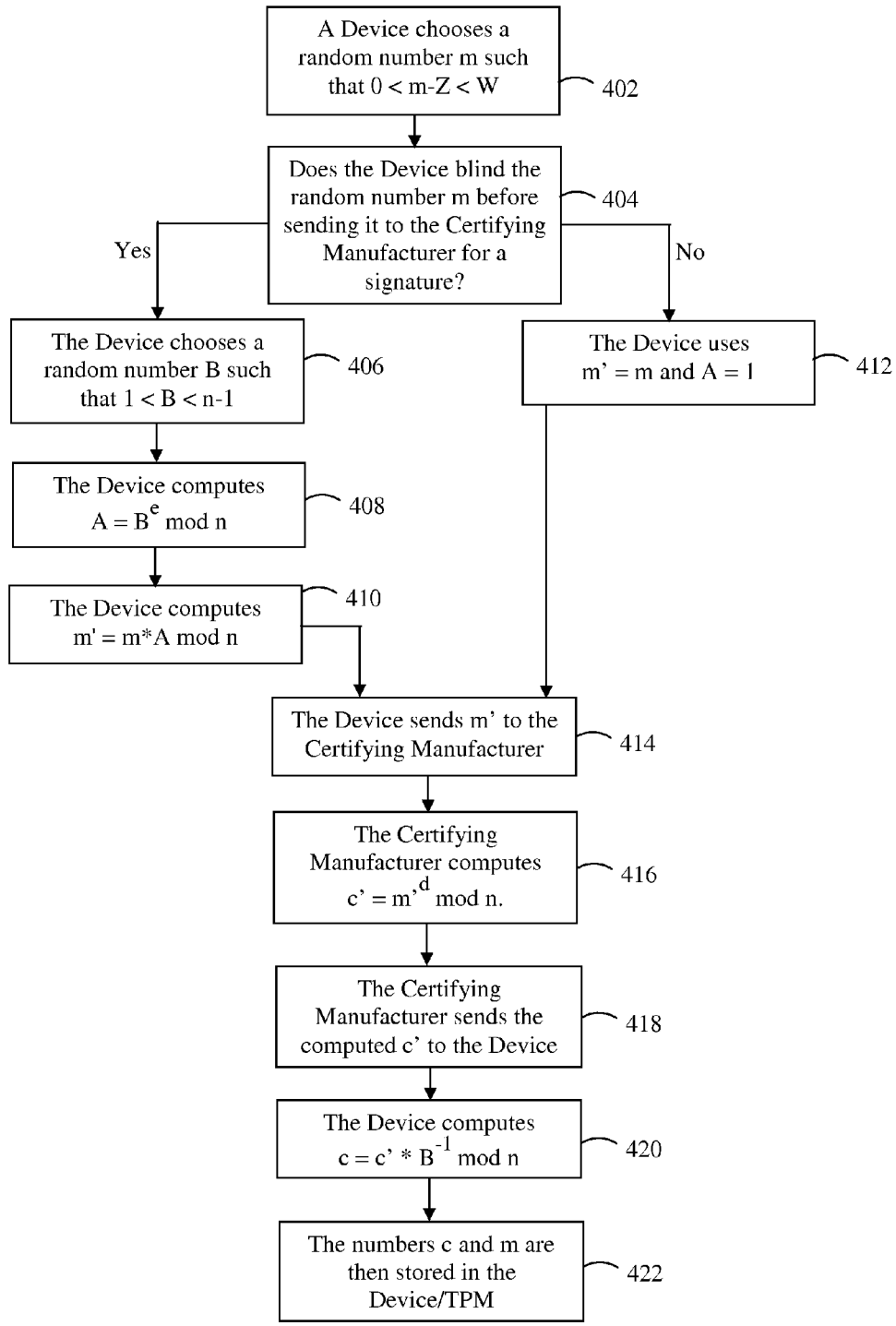
FIG. 4 illustrates the setup performed for each platform manufactured according to one embodiment of the invention.

FIG. 4 illustrates the setup performed for a Prover Platform or Device manufactured according to one embodiment of the invention. The Prover Device chooses a random number m such that $0<m-Z<W$ 402. The Prover Device may blind this random number m before sending it to the Certifying Manufacturer for a signature 404. In this case, the Prover Device chooses a random number, B, between 1 and n−1 406, and computes $A=B^e \bmod n$ 408. The Prover Device computes $m'=m*A \bmod n$ 410.

If the Device does not blind m, then the Device uses $m'=m$ and $A=1$ 412.

The Prover Device sends m' to the Certifying Manufacturer 414. The Certifying Manufacturer computes $c'=m'^d \bmod n$ 416, and gives c' to the Device 418. The Device computes $c=c'*B^{-1} \mod n$ 420. Notice that this implies that $c=m^d \mod n$. The numbers c and m are then stored in the TPM 422. The pair, c and m, is referred to as a signature of the Device Manufacturer.

Figure 5:
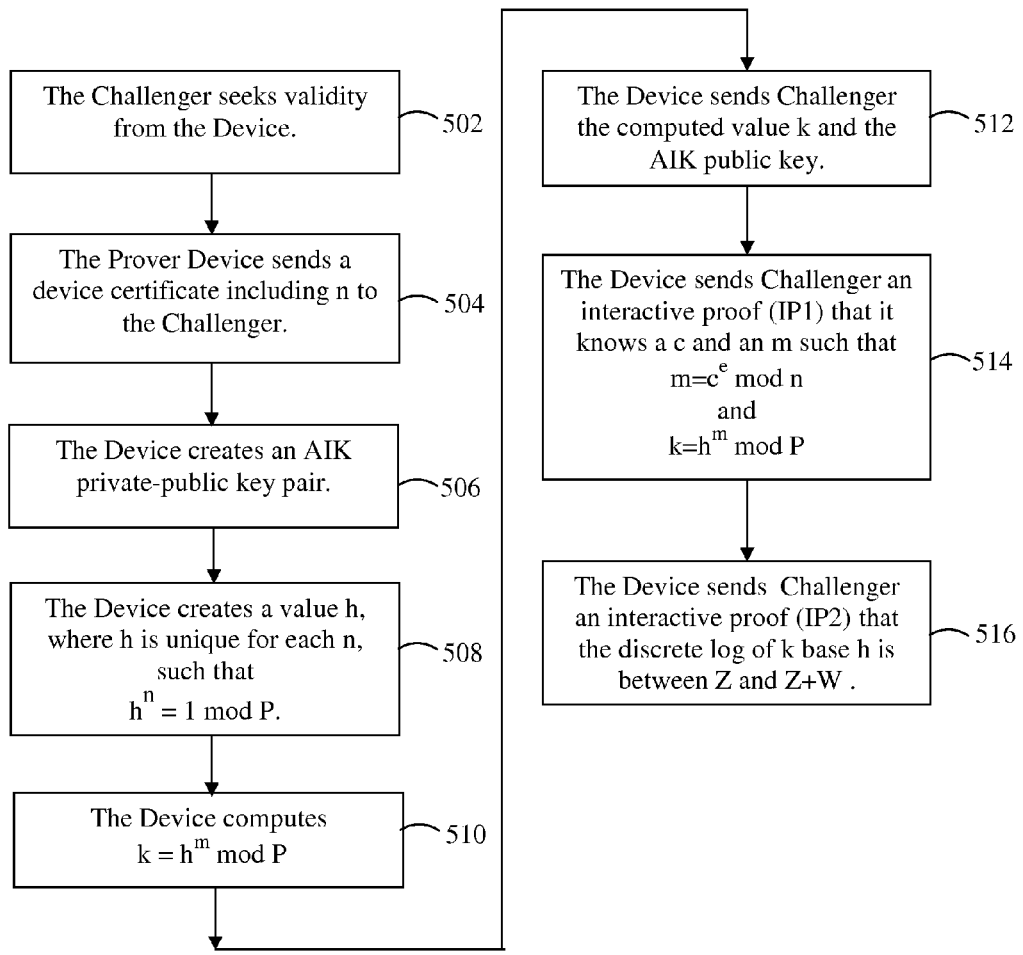
FIG. 5 illustrates an interactive proof method for a platform (prover) to prove to a challenger that it knows authentication information without revealing that information according to one embodiment of the invention.

FIG. 5 illustrates a method for a Prover Device to prove to a Challenger that it has a signature from the Certifying Manufacturer without revealing the signature according to one embodiment of the invention. A Challenger (e.g., Platform A 102) may send a message seeking validity (e.g., ascertain the validity of the device) from a Prover Device (e.g., Device B 104) having a TPM 502. This message may contain the name of the Challenger. The Prover Device sends a device certificate (e.g., Platform Class Certificate) to the Challenger including the number n 504. The TPM in the Prover Device creates an AIK private-public key pair 506. The private-public key pair includes a public key and a private key. In one embodiment, the TPM could have created the AIK private-public key pair sometime earlier. The TPM creates or generates a value h 508. The value h may be determined in a number of ways, including randomly generating the value h and generating the value h in a deterministic manner. The h value should have the property that $h^n=1 \mod P$ and that the TPM uses a different h value for each challenger.

In one embodiment of the invention, the value h may be generated in a random or pseudo-random manner. For example, the TPM may select a random number j between 1 and n−1, and compute $h=j^u \mod P$.

The TPM computes a k value, $k=h^m \mod P$ 510. The Prover Device then sends the Challenger the computed values h and k and the AIK public key 512.

In another embodiment of the invention, the value h may be generated in a deterministic manner. For example, the TPM may compute h in a deterministic manner from the name of the Challenger. One method to do this is to compute $H_i=HASH(i, \text{name of Challenger})$, for several values, say ten (10), of i=1,2,3 . . . , 10 and then to let j=the concatenation of $H_1 \| H_2 \| H_3 \ldots \| H_{10}$. Then, as above, the TPM computes $h=j^u \mod P$, where u=(P−1)/n as defined earlier. The TPM computes a k value, $k=h^m \mod P$. The Prover Device then sends the Challenger the computed value k and the AIK public key. The user of the TPM wants to be assured that a single h is not used with multiple parties, since this would break the anonymity of this TPM with these multiple parties. Therefore the TPM or the Prover Device might keep a list of all of the h values that it had used, so that it could disallow the use of a repeat, or at least inform the user if one was repeated. In one implementation of the invention, the Prover Device may also display the name of the Challenger, so that the Prover Device user would know the name. In this embodiment, a Challenger is sure that for every TPM key, there is only one $k=h^m \mod P$ that the TPM can have in the proof. So if the Challenger stores the k, along with the AIK, the Challenger can be sure that a single TPM hasn't created more than one AIK. This method may be referred to as the single h per Challenger method.

A single service provider could establish multiple challengers, each with its own name, and thus its own h. The different challengers would not be able to correlate the AIKs from a single TPM. It is an implementation decision of a service provider whether to allow multiple challengers within his business.

Figure 6:
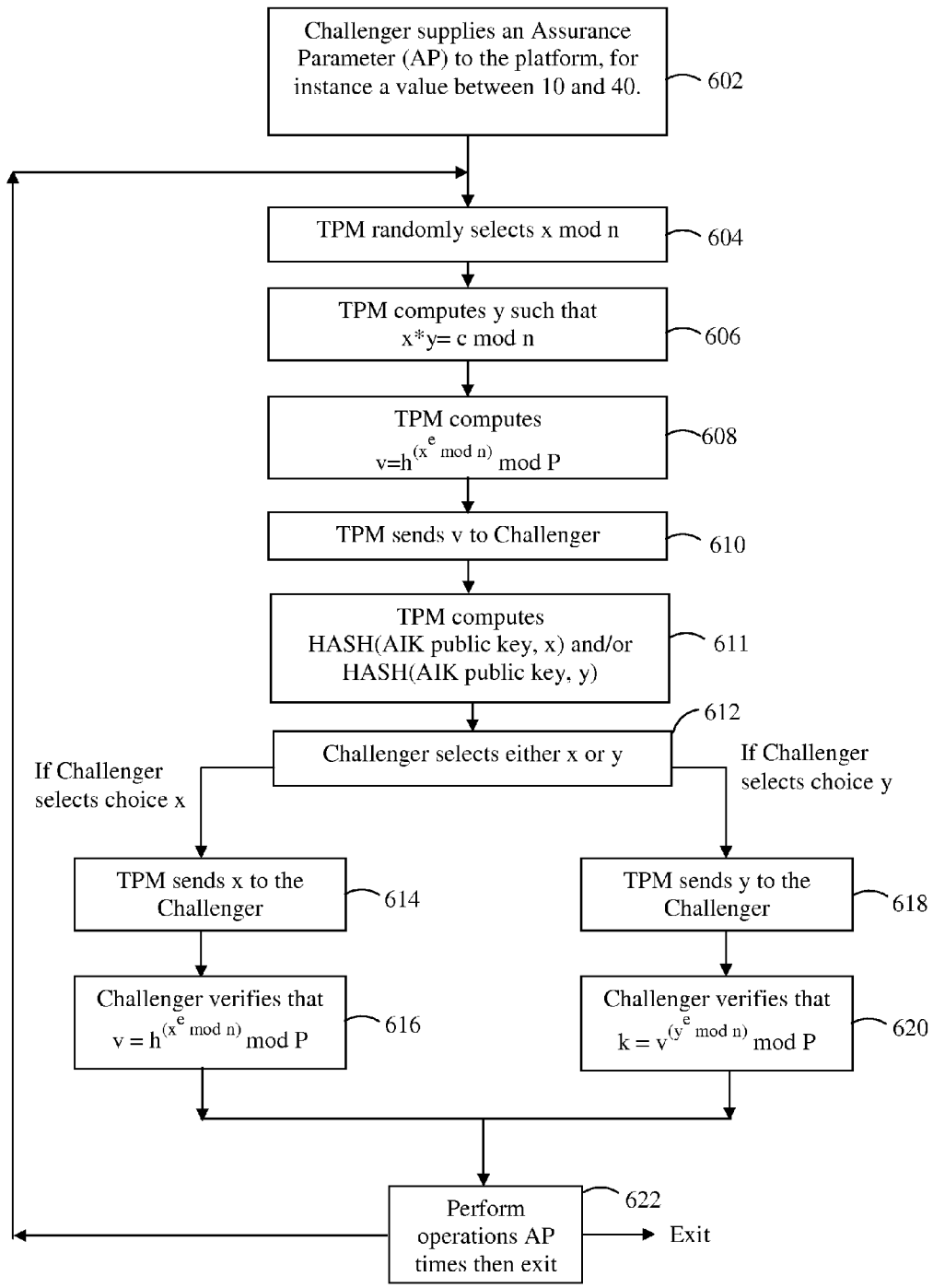
FIG. 6 is a flow diagram illustrating a method between a challenger and platform to implement the interactive proof (IP1) of FIG. 5.
Figure 7:
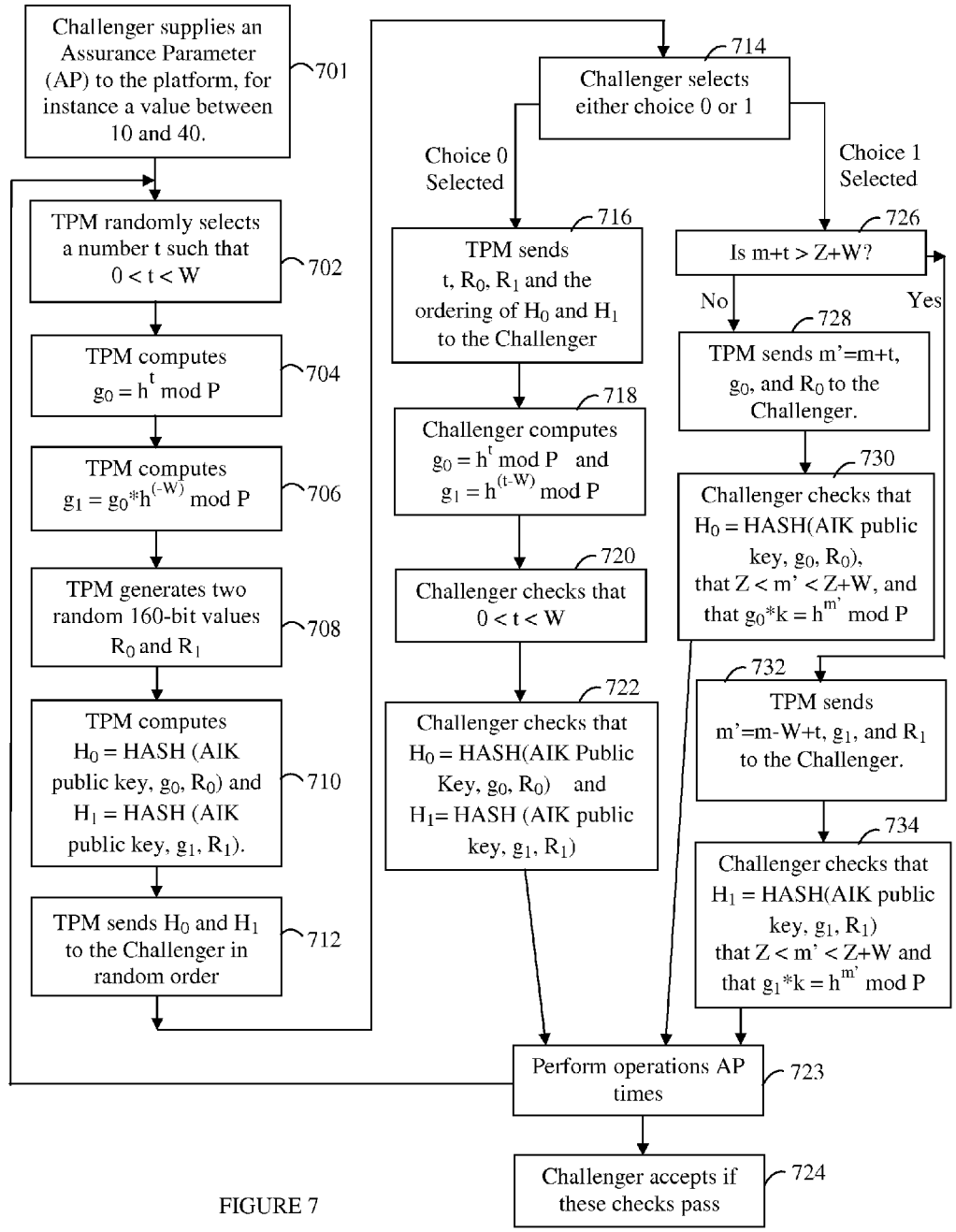
FIG. 7 is a flow diagram illustrating a method between a challenger and platform to implement the interactive proof (IP2) of FIG. 5.

The Prover Device then engages in an interactive proof (IP1) with the Challenger 514 that it knows a pair of values c and m such that $m=c^e \mod n$ and $k=h^m \mod P$. The Prover Device also engages in an interactive proof with the Challenger in a second interactive proof (IP2) indicating that the discrete log of k base h is between Z and Z+W 516. FIGS. 6 and 7 give illustrative embodiments of these two interactive proofs IP1 and IP2.

FIG. 6 is a flow diagram illustrating a method between a Challenger and Prover Device to implement the interactive proof IP1 of FIG. 5 according to one embodiment of the invention. The IP1 can be employed to prove that a TPM knows values c and m such that $m=c^e \mod n$ and $k=h^m \mod P$ without the TPM (part of the Prover Device) revealing c or m. The Challenger supplies an Assurance Parameter (AP) to the Prover Device, for instance, a value between ten (10) and forty (40) 602. The TPM then randomly selects a value x mod n 604. The TPM computes a value y 606, such that $x*y=c \mod n$, and computes a value v, such that $v=h^{(x^e \mod n)} \mod P$ 608. The TPM sends the value v to the Challenger 610. The TPM computes the values of HASH(AIK public key, x) and HASH (AIK public key, y) 611. The Challenger then elects to receive either x or y 612. If the Challenger elects to receive x, then the TPM sends x to the Challenger 614. The Challenger verifies that $v=h^{(x^e \mod n)} \mod P$ and that the HASH(AIK public key, x) was correctly sent. Otherwise, if the Challenger elects to receive y 618, then the TPM sends y to the Challenger, and the Challenger verifies that $k=v^{(y^e \mod n)} \mod P$ and that the HASH (AIK public key, y) was correctly sent 620. In one embodiment of the invention, this verification scheme is performed AP times 622.

FIG. 7 is a flow diagram illustrating a method between a Challenger and Prover Device to implement the interactive proof IP2 of FIG. 5 according to one embodiment of the invention. The IP2 can be employed to prove that a TPM knows a value m such that $Z-W<m<Z+2*W$, and $k=h^m \mod P$ without the TPM revealing m.

The Challenger supplies an Assurance Parameter (AP) to the Prover Device, for instance, a value between ten (10) and forty (40) 701. The TPM (part of the Prover Device) randomly selects a number t such that $0<t<W$ 702. The TPM computes $g_0=h^t \mod P$ 704 and $g_1=g_0*h^{(-W)} \mod P$ 706. The TPM generates two random 160-bit values, $R_0$ and $R_1$ 708, computes $H_0=HASH(AIK \text{ public key}, g_0, R_0)$ and $H_1=HASH(AIK \text{ public key}, g_1, R_1)$ 710, and sends $H_0$ and $H_1$ to the Challenger in random order 712.

The Challenger selects from two choices 714, for example, either choice 0 or 1.

If the Challenger selects choice 0, then the TPM sends t, $R_0$, $R_1$, and the ordering of $H_0$ and $H_1$ to the Challenger 716. The Challenger computes $g_0=h^t \mod P$ and $g_1=h^{(t-W)} \mod P$ 718. The Challenger checks that $0<t<W$ 720. The Challenger also checks that $H_0=HASH(AIK \text{ public key}, g_0, R_0)$ and $H_1=HASH(AIK \text{ public key}, g_1, R_1)$ 722. The Challenger accepts if all of these checks pass 724.

If the Challenger selects choice 1, then if m+t is in the interval between Z and Z+W 726, the TPM sends m'=m+t, $g_0$ and $R_0$, 728 and informs the Challenger to use the $H_0$. The Challenger checks that $H_0=HASH(AIK \text{ public key}, g_0, R_0)$, that m' is in the interval between Z and Z+W, and that $g_0*k=h^{m'} \mod P$ 730. If m+t>Z+W, then the TPM sends m'=m−W+t, $g_1$ and $R_1$ 732 and informs the Challenger to use the $H_1$. The Challenger checks that $H_1=HASH(AIK \text{ public key}, g_1, R_1)$, that $Z<m'<Z+W$, and that $g_1*k=h^{m'} \mod P$ 734. The Challenger accepts if the above checks pass 724.

In one embodiment of IP2, the above procedures are repeated AP times 723. Note that, repeating the procedure for IP1, as illustrated in FIG. 6 reference 622, and/or IP2, as illustrated in FIG. 7 reference 723, makes it less likely that an unauthorized or cheating prover can succeed in providing adequate proof to a challenger. That is, repeating a proof (e.g., IP1 or IP2) AP times forces a prover to succeed on each round, which is a 1 in $2^{AP}$ chance.

After the TPM has successfully completes the IP1 and IP2 processes described above, the Challenger is convinced that the Prover Device/TPM knows values m and c such that Z−W<m<Z+2*W, and c=$m^d$ mod n. In other words, c is a signature of m. To compute a signature of m for a given value in the interval is equivalent to breaking RSA. To compute a signature of any value in the interval without knowing the factorization of the modulus n, is a difficult computational problem.

The protocols described in FIGS. 6 and 7 have the disadvantage of requiring multiple rounds of communications between the TPM (Prover Device) and Challenger. However, in another embodiment of the invention, these protocols may be converted to limited round protocols.

Figure 8:
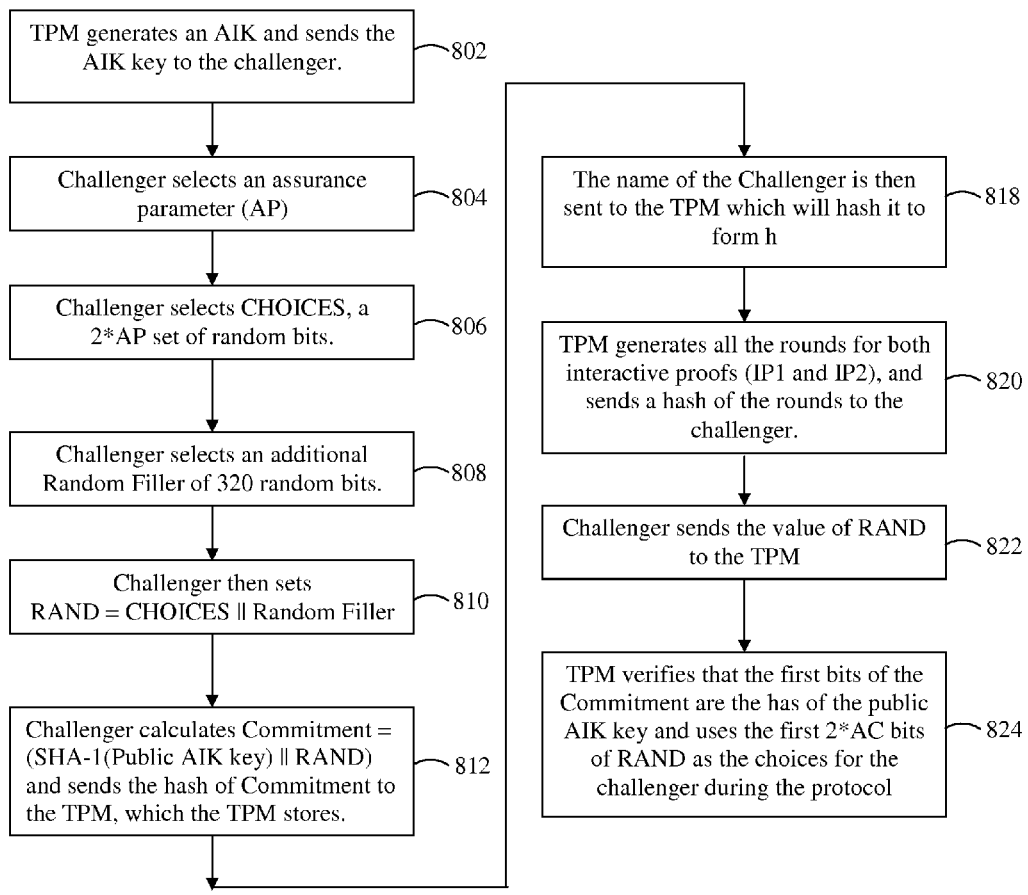
FIG. 8 illustrates how a direct proof may be implemented in a limited number of rounds to expedite the authentication process according to one embodiment of the invention.

FIG. 8 illustrates how a direct proof may be implemented in a limited number of communications to expedite the authentication process according to one embodiment of the invention. The TPM generates an AIK private-public key pair, which includes an AIK public key and a AIK private key, and sends the AIK public key (or just the HASH of the AIK public key) to the Challenger 802. The Challenger selects an assurance parameter (AP) 804, selects a 2*AP set of random bits (CHOICES) 806, and selects an additional Random Filler of three hundred twenty (320) random bits 808. The Challenger then sets RAND=CHOICES || Random Filler 810, calculates Commitment=(Public AIK key || RAND), and sends the HASH of Commitment to the TPM, which the TPM stores 812.

The TPM determines an h value to use with this Challenger using one of the methods described above, either generating h using a random method or generating the h from the name of the Challenger in the single h per Challenger method 818.

Instead of serially computing values one loop at a time as illustrated in FIGS. 6 and 7, the TPM now generates all the calculations for all rounds (loops) of the method for both interactive proofs (IP1 and IP2) and sends all of the calculated values for all rounds to the Challenger 820. The set of calculated values would include, k, h; from each round of IP1, v, HASH(AIK public key, x), and HASH(AIK public key, y); and from each round of IP2, $H_0$ and $H_1$. The Challenger then sends the value of RAND to the TPM 822. The TPM verifies that the first bits of the Commitment are the hash of the public AIK key and uses the first 2*AC bits of RAND as the choices for the challenger during the protocol 824. The TPM prepares the responses for all of the rounds based on these choices, and then sends them all of the responses back to the Challenger.

In one embodiment of the limited communications version, the HASH(AIK public key, x) and the HASH(AIK public key, y) is not sent to the Challenger. Similarly, the value of $H_0$=HASH ($g_0$, $R_0$) instead of HASH (AIK public key, $g_0$, $R_0$) and $H_1$ is HASH($g_1$,$R_1$) instead of HASH(AIK public key, $g_1$, $R_1$)

In certain implementations, it may be desirable to allow Challengers to revoke a TPM if it is determined or suspected that the TPM or its key(s) has been compromised.

One instance in which a Challenger may determine that a Prover Device's TMP has been compromised is that a key (c and m) for a compromised TPM may be widely disseminated, such as a posting on the web. In this instance, the Challenger can revoke that TPM. For example, suppose that $c_0$ and $m_0$ are the keys of the compromised TPM that have been posted. Whenever the Challenger sees an h value, the Challenger computes $k_0$=$h^{m_0}$ mod P. If this matches the value k given by the prover, then the Challenger knows that the m used by the prover matches the $m_0$ of the compromised TPM, and thus the Challenger will not accept it.

In another embodiment of revocation, suppose the Challenger always stores the h and k values together with the AIK values. Then when a Challenger receives compromised keys $c_0$ and $m_0$, the Challenger can check to see if any of the h and k values received were computed using the compromised keys $c_0$ and $m_0$. He does this by computing $k_0$=$h^{m_0}$ mod P and checking to see if that matched the k value he received from the TPM. If so, he revokes the corresponding AIK value. If the single h per Challenger method is being used, then the computation by the Challenger is easier, since the Challenger just needs to compute $k_0$ and see if this matches any of the k's received by the Challenger.

In another instance in which a Challenger may determine that a key has been compromised, a Challenger may detect a usage pattern for the TPM that is indicative of having been compromised. For example, two connections to the Challenger from different Prover Devices at the same time may indicate a compromised key. If the single h per Challenger method is used, the Challenger would know that two connections used the same m, since the same k=$h^m$ mod P would be associated with both connections. The Challenger may decide that the secret values could have been compromised, so that Challenger will not accept any more direct proofs using that k. Then the secret values from that TPM can no longer be used with that Challenger. However, this Challenger can't tell any other Challenger not to use secret values coming from that TPM, since the Challenger doesn't know the value of m.

In another embodiment of the invention, a group of Challengers may decide that they want to all be able to revoke the secret values of a TPM if one of the Challengers in the group decides that those secret values may have been compromised. Enabling this feature requires a change to an embodiment of the invention as it has been described above. The change involves how the values of h are determined. A Trusted Revocation Authority (TRA) is formed. The TRA has a public verification, private signature key pair, such as a standard RSA key pair. The TRA public key is given to the TPM using some secure distribution method, such as having the manufacturer put the key into the TPM during manufacturing.

The TRA generates a g value such that $g^n$=1 mod P. The TRA can do this by generating a random g' value between 1 and P, and then computing g=$g'^u$ mod P. Then for each challenger in the group, the TRA will pick an exponent (EXP) at random between 1 and n, and compute h=$g^{EXP}$ mod P. The TRA then signs a certificate with the name of this Challenger and this h value in the certificate. The TRA securely stores the EXP used to create the h for each Challenger.

When a TPM initiates a direct proof with a Challenger in the group, the Challenger sends this certificate for the h value. The TPM validates this certificate by checking the signature of the TRA. If valid, then the TPM uses this h value, instead of generating an h value as described in an earlier embodiment. Other aspects of the direct proof remain the same.

When a Challenger$_1$, with $h_1$ as its h value, announces that it wants to revoke the TPM which created $k_1$=$h_1{}^m$ mod P, the TRA retrieves $EXP_1$, the EXP value used to compute $h_1$ as h1=$g^{EXP_1}$ mod P. Note that neither the Challenger$_1$, nor the TRA may know the value of m in the TPM that the Challenger$_1$, wants to revoke. To tell Challenger$_i$ the k value to revoke, the TRA computes $b_1$=$EXP_1{}^{(-1)}$ mod n, and then computes $k_i$=$k_1{}^{(EXP_i * b_1)}$ mod P. Notice that $k_i$=$h_i{}^m$ mod P. Notice that the TRA did not compute m during this computation; $k_i$ is then sent to Challenger$_i$, and Challenger$_i$ can then revoke $k_i$ if it desires.

While certain exemplary embodiments of the invention have been described and shown in the accompanying drawings, it is to be understood that such embodiments are merely illustrative of and not restrictive on the broad aspects of various embodiments of the invention, and that these embodiments not be limited to the specific constructions and arrangements shown and described, since various other modifications are possible. It is possible to implement the embodiments of the invention or some of their features in hardware, programmable devices, firmware, software or a combination thereof.

What is claimed is:

1. A method comprising:
   receiving an authentication request from a challenger device;
   sending information to the challenger device from a prover device; and
   convincing the challenger device that a valid signature is known by the prover device without revealing the signature to the challenger device.

2. The method of claim 1 wherein the information sent to the challenger device includes a device certificate for the prover device.

3. The method of claim 1 further comprising:
   generating a value k based on a one-way function; and
   generating a private-public key pair in the prover device, the private-public key pair including a private key and a public key, wherein value k and the public key are included in the information sent to the challenger device.

4. The method of claim 3 wherein the value k is defined as $k = h^m \bmod P$, where h is a unique number generated by the prover device, m is a randomly generated number, and P is a large prime number.

5. The method of claim 1 wherein convincing the challenger device that a valid signature is known by a prover device without revealing the signature to the challenger device includes
   sending the challenger device an interactive proof that the prover device knows the signature without revealing the signature to the challenger device.

6. The method of claim 1 further comprising:
   convincing the challenger device that the prover device knows the valid signature without revealing the identity of the prover device.

7. The method of claim 1 wherein
   convincing the challenger device that the signature known by the prover device is not on a revocation list of compromised device signatures without revealing the signature known by the prover device.

8. A device comprising:
   a communication port; and
   a processing unit, the processing unit configured to communicate with a challenger platform over the communication port, and
   convince the challenger platform that the device knows a secret without revealing the identity of the device.

9. The device of claim 8 wherein convincing the challenger platform that the device knows the secret without revealing the identity of the device includes
   proving to the challenger platform that it has a valid signature of a known entity without revealing the signature, and
   tying a value correlated with the secret to the communication with the challenger platform so that a different value cannot be substituted without violating the proof.

10. A system comprising:
    a challenger device; and
    a prover device communicatively coupled to the challenger device, the prover device configured to convince the challenger that the prover device has a valid signature of a known entity without revealing the signature.

11. The system of claim 10 wherein convincing the challenger device that the prover device has a valid signature of a known entity without revealing the signature includes
    revealing to the challenger device the result of a one-way function of a secret held by the prover device, and
    proving to the challenger device that the secret has a valid signature without revealing the secret to the challenger device.

* * * * *